United States Patent [19]

Lee et al.

[11] Patent Number: 5,404,130
[45] Date of Patent: Apr. 4, 1995

[54] SUDDEN-STOP BRAKE-LIGHT WARNING SYSTEM

[76] Inventors: Dong H. Lee, 5113 Ramsdell Ave., LaCrescenta, Calif. 91214; Myung H. Lee, 403-20 Seogyo-Dong, Mapo-Ku, Seoul, Rep. of Korea; Hea Soon Lee, 5113 Ramsdell Ave., LaCrescenta, Calif. 91214

[21] Appl. No.: 107,855
[22] PCT Filed: Apr. 27, 1992
[86] PCT No.: PCT/US92/03457
  § 371 Date: Aug. 25, 1993
  § 102(e) Date: Aug. 25, 1993
[87] PCT Pub. No.: WO92/19467
  PCT Pub. Date: Nov. 12, 1992

[30] Foreign Application Priority Data

Apr. 27, 1991 [KR] Rep. of Korea ............... 5885

[51] Int. Cl.6 ............................................. B60Q 1/44
[52] U.S. Cl. ............................... 340/479; 340/464; 340/468; 340/436; 340/467
[58] Field of Search ............... 340/479, 467, 463, 464, 340/468, 436

[56] References Cited

U.S. PATENT DOCUMENTS

| | | | |
|---|---|---|---|
| 3,382,405 | 5/1968 | Johnson | 340/479 |
| 3,528,056 | 9/1970 | Voevodsky | 340/479 |
| 3,559,164 | 1/1971 | Bancroft et al. | 340/479 |
| 3,593,278 | 7/1971 | Bower | 340/467 |
| 3,665,391 | 5/1977 | Bumpous | 340/467 |
| 3,760,353 | 9/1973 | Hassinger | 340/467 |
| 3,846,749 | 11/1974 | Curry | 340/467 |
| 4,403,210 | 9/1983 | Sullivan | 340/479 |
| 4,663,609 | 5/1987 | Rosario | 340/467 |
| 4,843,368 | 6/1989 | Poulous | 340/464 |
| 4,983,953 | 1/1991 | Page | 340/467 |
| 5,059,947 | 10/1991 | Chen | 340/467 |

*Primary Examiner*—John K. Peng
*Assistant Examiner*—Nina Tong
*Attorney, Agent, or Firm*—Albert O. Cota

[57] ABSTRACT

A sudden-stop brake-light warning system (10) that causes the brake lights (56) of a vehicle to intermittently pulsate. The pulsation of the lights (56) is achieved by a flashing brake-light circuit (12) that is only activated when the brake pedal is depressed during a panic stop. The circuit (12) consists of a mercury switch (51), located in an inertia operative switching circuit (16), that closes only when the brake switch (54) is depressed during a panic stop. When the switch (54) closes, the power from the vehicle battery (52) is applied to the gate of a silicon controlled rectifier (CR1) located in a silicon controlled rectifier circuit (18). The energizing of CR1 enables a multivibrator circuit (14) connected via a relay driven transistor (Q3) to the coil (20A) of a relay (K1) located in a relay drive/relay circuit (20). The relay is pulsed in accordance with the time constant of the multivibrator and as the coil (20A) pulses, so are the brake lights (56).

11 Claims, 2 Drawing Sheets

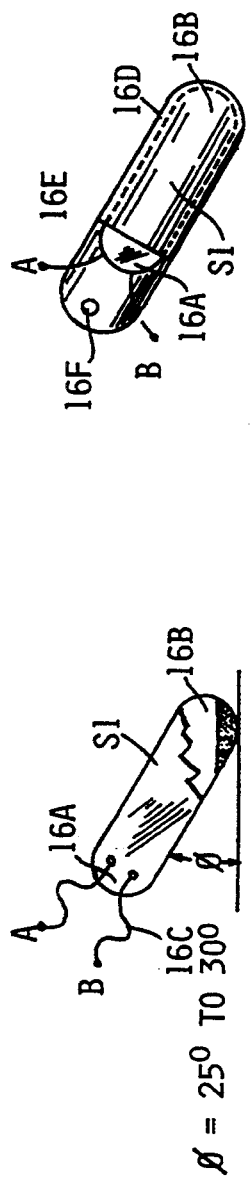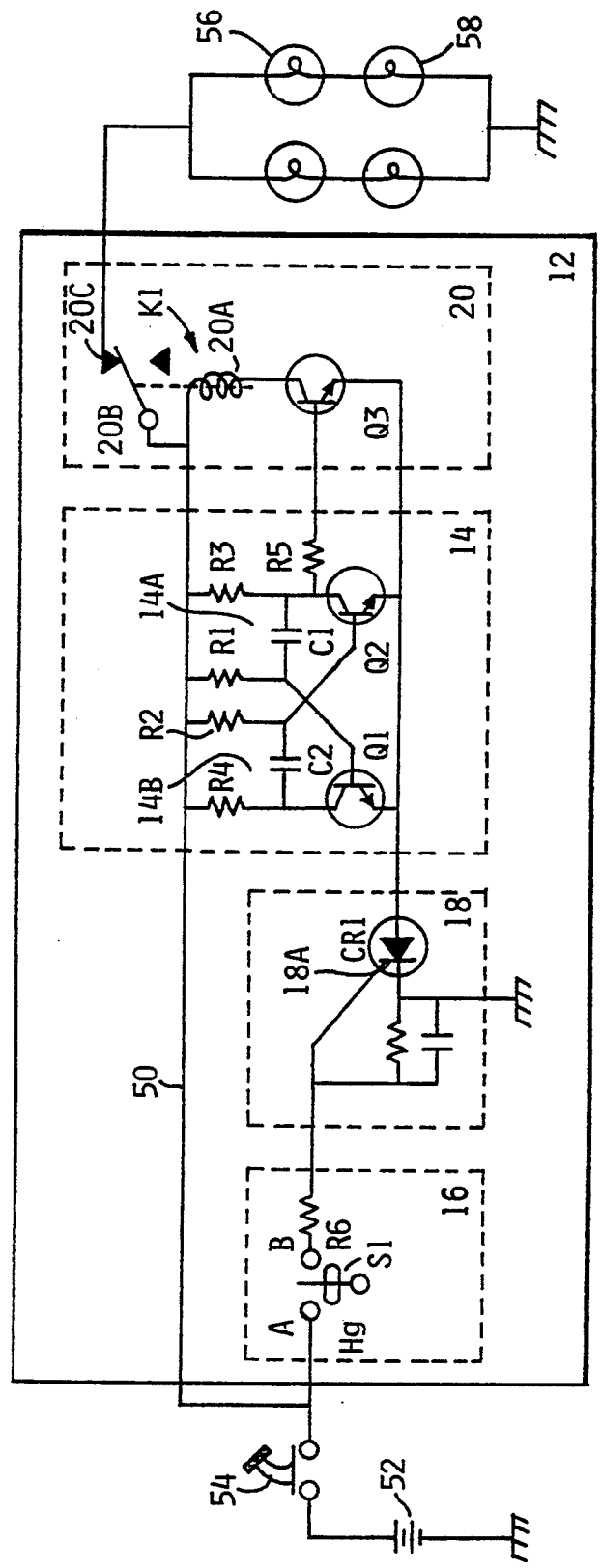

SUDDEN-STOP BRAKE-LIGHT WARNING SYSTEM

TECHNICAL FIELD

The invention pertains to the general field of brake lights as used on vehicles such as automobiles and trucks and more particularly to such brake lights that flash intermittently during a sudden or panic stop.

BACKGROUND ART

It has long been known that intermittently flashing lights attract more attention than lights that illuminate constantly. This is particularly true in automobiles where currently, the turn indicating lights in both the front and back flash intermittently to warn and alert drivers of an impending left or right turn. However, even though flashing lights are more noticeable, they are not employed with vehicle brake lights. The brake lights in current use, conventionally remain continuously illuminated as long as the brake light switch remains closed by the continuous pressure applied to the brake pedal.

The conventional brake light circuit which operates a pair of lights located at the rear of a vehicle has in many instances failed to produce adequate warning. This problem is especially prevalent on newer vehicles that have a large assemblage of lights on the rear panel of the vehicle. In addition, turn signals which are normally located in the same light assembly with the taillights and stoplight often add to the confusion as to whether brakes are being applied or a turn is to be made.

One of the problems in driving is that to drive safely, a driver needs to know how quickly the automobile in front is slowing down with conventional brake lights, an illuminated light only-means that the driver has his or her foot on the brake pedal. The trailing driver does not know if the vehicle is decelerating slowly or whether a sudden panic stop is about to take place. The brake light used in conventional vehicles looks the same in either case.

With vehicles traveling at high speeds on interstate and freeway road systems with relatively little spacing between vehicles; the ambiguity in brake lights can and has caused rear end collisions with consequent vehicular damage, human injury, loss of life and further road congestion.

A search of the prior art did not disclose any patents that read directly on the claims of the instant invention however, the following U.S. patents were considered related:

| U.S. PAT. NO. | INVENTOR | ISSUED |
| --- | --- | --- |
| 5,059,947 | Chen | 22 October 1991 |
| 4,663,609 | Rosario | 5 May 1987 |
| 3,593,278 | Bower | 13 July 1971 |
| 3,528,056 | Voevodsky | 8 September 1970 |

U.S. Pat. No. 5,059,947 issued to Chen, discloses a vehicle brake warning device for use in a vehicle with a brake pedal. The device includes a detector for producing different electrical signals in response to the magnitude of the inertia force experienced during braking. Whenever a pressing force is exerted on the brake pedal, the detector experiences an inertia force whose magnitude depends upon the speed of the vehicle. The detector sends an appropriate signal dependent upon the magnitude of the inertia force to a control circuit which then activates a warning device which activates the brake lights.

U.S. Pat. No. 4,663,609 issued to Rosario discloses a brake light warning system for a motor vehicle which causes the brake lights to flash in a manner to attract the attention of a driver to the rear of the vehicle. The system provides a warning of a slow down or stopping of the vehicle upon the application of the brakes. The brake lights are first caused to flash rapidly for 2 or 3 times for a first interval of time followed by prolonged "on" periods interrupted periodically by a short "off" period followed by a short "on" period followed by a short "off" period for a second interval of time as long as pressure is applied to the brake pedal of the vehicle.

U.S. Pat. No. 3,593,278 issued to Bower discloses a vehicle brake light system wherein a flashing signal of variable frequency indicates the rate of deceleration of a vehicle. The system includes a series of inertia switches and resistors forming a decelerometer, a multivibrator and a transistorized gate circuit which flashes the brake lights at a frequency proportional to the detected rate of deceleration.

U.S. Pat. No. 3,528,056 issued to Voevodsky discloses a device for measuring the deceleration of a leading vehicle. The device uses an accelerometer formed by mercury switches tilted at different angles with respect to a horizontal. They are progressively closed as the deceleration increases. In another form, deceleration is measured by brake pressure and in still another form a tachometer device is coupled to a rotating part of the automobile. The warning light, mounted on the leading car, is flashed at a rate which varies exponentially with a component of deceleration.

For background purposes and as indicative of the art to which the invention relates, reference may be made to the following remaining patents found in the search:

| U.S. PAT. NO. | INVENTOR | ISSUED |
| --- | --- | --- |
| 4,983,953 | Page | 8 January 1991 |
| 4,403,210 | Sullivan | 6 September 1983 |
| 3,559,164 | Bancroft | 26 January 1971 |
| 3,382,405 | Johnson | 7 May 1968 |

DISCLOSURE OF THE INVENTION

The sudden-stop brake-light warning system provides a driver in a vehicle following another vehicle with a positive warning signal that the front vehicle is about to make a sudden stop. The warning is provided by the brake lights that have been modified by the system to intermittently flash when such a "panic" stop is about to be made.

The system employs a flashing brake light circuit that does not interfere with the existing vehicle brake-light circuit. The inventive circuit becomes operational only if the driver depresses the brake pedal to make a sudden or panic stop. In this occurrence, the brake lights begin to flash intermittently to provide a positive and explicit warning.

In the preferred embodiment, the flashing brake-light circuit consists of four major elements: a multivibrator that sets the pulse rate of the blinking lights; a silicon controlled rectifier (SCR) circuit that enables the multivibrator when a panic stop occurs. The SCR has its gate connected to an inertia operative switching circuit that employs a mercury switch. The other conductive side of the mercury switch is connected to the vehicle battery via the brake pedal activated brake switch. The mercury switch is located in a sloping attitude so that both inertia and gravity can be utilized to control the sensitivity of the switch. The output of the multivibrator is applied to a relay drive transistor located in a relay drive/relay circuit, that drives a single-pole double-throw relay.

When the multivibrator is disabled and the brake switch is normally depressed, the power from the vehicle battery is applied through the normally closed contact of the relay onto at least one of the brake lights. However, when the multivibrator is enabled, the relay driver transistor pulses the coil of the relay causing the normally closed contacts pulsate in accordance with the time constant of the enabled multivibrator. Thus, the brake lights are caused to flash ON and OFF to provide the panic stop warning.

In view of the above disclosure, it is the primary object of the invention to include a vehicle a crash deterrent safety feature that provides a tailgating driver, with more time to react to a sudden or panic stop to thus avoid incidents of rear end collisions.

In addition to the primary object, it is also an object of the invention to provide a system that:
- utilizes the existing brake light circuit of a vehicle and that can add additional lights, connected in parallel, to the front or side of the vehicle;
- allows both brake lights to flash simultaneously to avoid confusion with left and right turn indicators;
- does not interfere with the existing brake-light circuit or any other vehicle electrical system;
- is reliable, requires minimum maintenance and is fail safe in operation;
- is relatively simple in design and is substantially easy to install in any type of vehicle including automobiles, trucks, buses and motorcycles;
- produces a flashing light which is substantially universally recognized as being a caution or hazard signal.

These and other objects and advantages of the present invention will become apparent from the subsequent detailed description of the preferred embodiment and the claims taken in conjunction with the accompanying drawings.

BRIEF DESCRIPTION OF THE DRAWINGS

FIG. 2 is a schematic diagram of the sudden-stop brake-light warning system attached to the existing vehicle brake-light circuit.

FIG. 3 is a side elevational view of a mercury switch that is set to the required slope angle by means of its electrical leads.

FIG. 4 is a side elevational view of a housing into which is inserted a mercury switch and which has a tab that allows the housing to be fastened to a structure of the required slope angle.

BEST MODE FOR CARRYING OUT THE INVENTION

Figure 1:
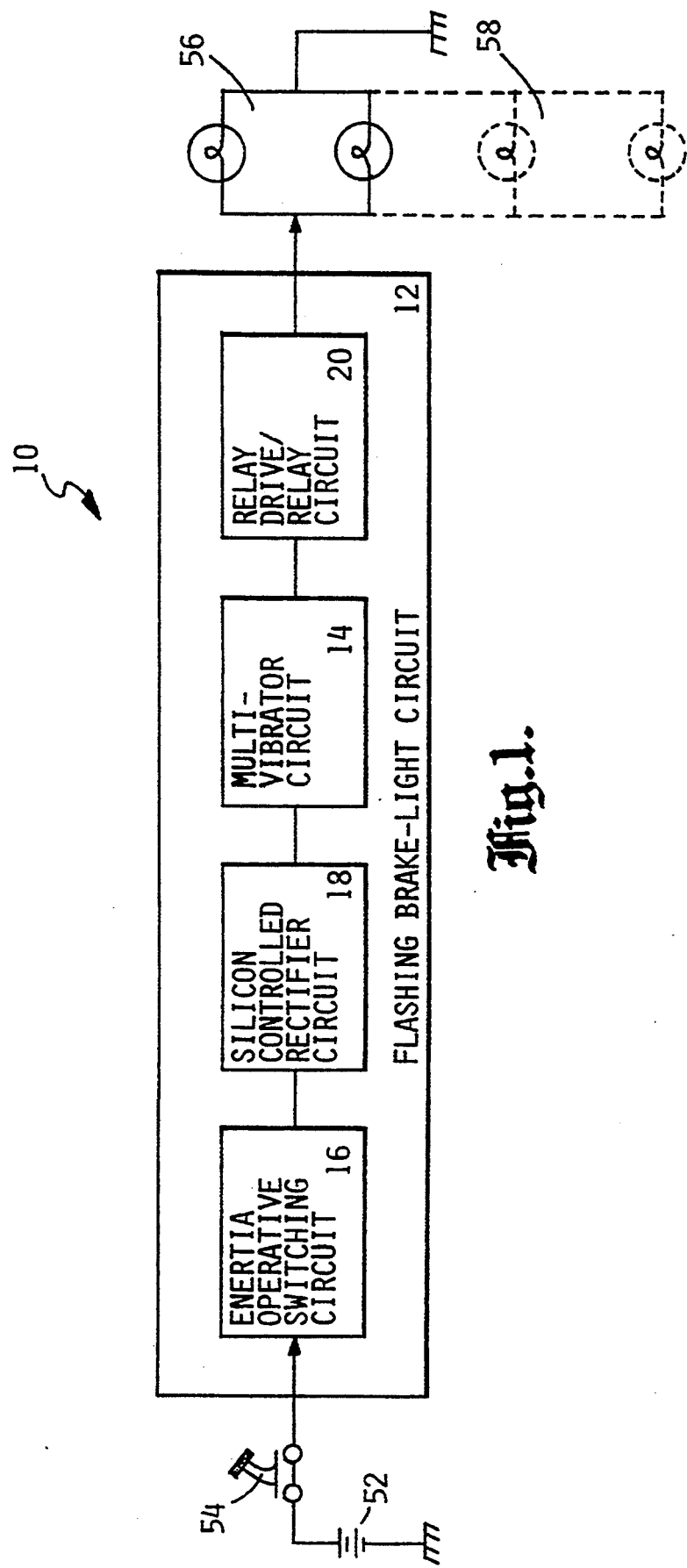
FIG. 1 is a block diagram of the sudden-stop brake-light warning system attached to the existing vehicle brake-light circuit.

The best mode for carrying out the sudden-stop brake-light warning system 10 is presented in terms of a preferred embodiment that is designed to provide a trailing driver with a visual warning that the vehicle in front is in the process of making a sudden stop.

The preferred embodiment as shown in FIG. 1 through 4 is comprised of the following major elements: a flashing brake-light circuit 12 that further consists of a multivibrator circuit 14, an inertia operative switching circuit 16, a silicon controlled rectifier circuit 18 and a relay drive/relay circuit 20. The circuit 12 operates in combination with an existing vehicle brake-light circuit 50 consisting of a power source typically a vehicle battery 52, a brake pedal operated brake switch 54 connected between the power source and at least one brake light 56.

The system 10 is designed to function in two operational modes: a normal brake-light mode and a flashing brake-light mode.

The normal mode uses the existing brake-light circuit 50 that bypasses the flashing brake-light circuit 12. In this normal mode, when the brake pedal is normally depressed, the current path as shown in FIG. 2, is from the vehicle battery 52 through the brake pedal operated brake switch 54 through the pole 20B and normally closed contact 20C of a relay K1 that is located in the relay drive/relay circuit 20. The relay K1 is preferably comprised of a 12-volt relay that is powered by the vehicle's 12-volt battery 52. From the relay contact 20C, the current is applied directly to illuminate at least one brake light 56.

The flashing brake-light mode becomes operational only when the brake pedal is suddenly depressed such as in a "panic" stop. In this case, the flashing brake light circuit 12 is automatically connected into the circuit path of the brake lights 54 as shown in block form in FIG. 1 and schematically in FIG. 2. Each element of the circuit 12 is next described with reference to FIGS. 1 and 2.

The multivibrator circuit 14 is configured as a flip-flop type consisting of a pair of cross connected NPN transistors Q1 and Q2 preferably of the 2N2222 type. The circuit 14 is normally inoperative and can only be enabled when the inertia operative switch 16 closes which only occurs during a panic stop. When the switch 16 closes, a silicon controlled rectifier CR1 is turned on which then enables the multivibrator 14 as described infra. When the circuit 14 is enabled the transistors continuously switch alternatively from a conducting state to a nonconducting state to generate a pulse output that is applied through output resistor R5 to the relay drive/relay circuit 20 also described infra.

The collectors of transistors Q1 and Q2 as shown in FIG. 2, are connected to resistor-capacitor networks 14A and 14B. The time constants of these networks are identical and are determined by capacitor C1 and resistor R1, and capacitor C2 and resistor R2 respectively. The two resistor-capacitor networks 14A, 14B alternatively charge and discharge at a frequency determined by the time constant of the networks and the frequency is equal to $1/(C1*R1+C2*R2)$. This frequency which determines the flashing rate of the lights 56, can be set to range between 2 Hertz and 3 Hertz by the proper selection of capacitor C1 and resistor R1, and capacitor C2 and resistor R2.

The enabling and disabling of the multivibrator circuit 14 is provided by the silicon controlled rectifier circuit 18. The circuit 18 includes a 2N5061 silicon controlled rectifier (SCR) CR1 which requires very little current to be turned on. If an SCR is not included in the circuit 18, the multivibrator 14 will turn-on for only a brief time (approximately two seconds). This time period is insufficient to alert the driver of a tailgating vehicle. The SCR has its gate 18A connected through resistor R6 to the second contact B of the inertia activated switch 51 located in the inertia operative switching circuit 16, and its anode connected to the emitter of transistor Q1 and Q2 in the multivibrator circuit 14. Under normal conditions the gate 18A or CR1 is OFF and the ground/bypass circuit connected to the cathode of CR1 keeps the multivibrator disabled by maintaining the emitters of Q1 and Q2 grounded. When the brake pedal is suddenly depressed such as in a panic stop, the brake switch 54 closes and the sudden jarring of the vehicle caused by the panic stop causes the inertia switch 51 to close. The switch 51, which in the preferred embodiment consists of a mercury switch as shown in FIGS. 3 and 4, has a first contact A and a second contact B. The first contact A is connected to the positive terminal of the vehicle battery 52 through the brake switch 54. With the mercury switch 51 closed, the positive voltage from the battery 52 is applied through resistor R6 to the gate 18A of the SCR CR1. Upon the application of this positive voltage, the gate opens, the SCR is turned ON and the multivibrator circuit is enabled.

The output of the enabled multivibrator circuit is applied through resistor R5 to the base of a relay driver 2N2222 NPN transistor Q3 located in the relay drive/relay circuit 20, the emitter of transistor Q3 is in a common connection with the emitters of transistors Q1, Q2 in the multivibrator and the Q3 collector is connected directly to one side of the coil 20A of relay K1. The direct output current of the multivibrator 14 is insufficient to energize the coil of the relay K1. Therefore, transistor Q3 is used to increase the current to allow the relay K1 to be energized. The other side of the relay coil is connected to the relay's pole 20B which is also in line with the normal brake-light circuit 50. Thus, as previously mentioned, under normal braking conditions, the multivibrator circuit 14 is disabled and the relay, through contact 20C, allows the brake lights 56 to illuminate. However, with the multivibrator circuit 14 enabled, the relay is caused to oscillate in synchronization with the time constant provided by the multivibrator allowing the lights 56 to rapidly flash ON and OFF during the time period that the multivibrator is enabled.

The sensitivity of the flashing brake-light circuit 12 is primarily dependent on the energizing speed of the mercury switch 51. In practice, this switch S1 is attached to the inertia-operative switching circuit 16 with a means for allowing the switch to be placed in a selective slope $\phi$ with respect to the vehicle's horizontal plane. Through testing, it was determined that the slope best suited for this application is between 25 and 30 degrees with the switch's conductive base end 16A located higher than its front end 16B. With this configuration, the relationship between inertia and gravity is utilized to close the electrical leads in the conductive end at an optimum time.

Two mercury switch attachment schemes can be utilized to set the required switch slope $\phi$. The preferred method is to bend the electrical leads 16C as shown in FIG. 3 and then move the switch to the selected slope. Alternatively, as shown in FIG. 4, a housing 16D may be employed into which is inserted the switch S1 with its electrical leads extending from the back of the housing. At the back end of the housing is an outwardly extending side tab 16E that is attached, by means of a fastener 16F, to a structural member on the vehicle near the system 10.

The system primarily is designed to operate with the conventional rear brake lights 56 of a vehicle. However, the system may also be operated with a second set of at least one brake light 58 connected in parallel with at least one brake light 56 as shown in FIGS. 1 and 2. This second set of lights 58 may be add-ons attached to the front of the vehicle or they may be comprised of the vehicle's front right and left turning lights. In either case, the additional set of blinking light adds another degree of safety to the vehicle.

While the invention has been described in complete detail and pictorially shown in the accompanying drawings, it is not to be limited to such details, since many changes and modifications may be made in the invention without departing from the spirit and scope thereof. Hence, it is described to cover any and all modifications and forms which may come within the language and scope of the appended claims.

We claim:

1. A sudden-stop brake-light warning system that functions in combination with an existing vehicle brake-light circuit comprising a power source, a brake pedal operated brake switch connected between the power source and at least one brake light, said system comprising:
    a) a flashing brake-light circuit comprising:
        (1) a multivibrator circuit,
        (2) an inertia-operative switching switch circuit that includes an inertia-activated switch having a first contact A connected to the power source through the brake switch and a second contact B,
        (3) a silicon controlled rectifier circuit that includes a silicon controlled rectifier having its gate connected to the second contact B of said inertia-activated switch and its anode connected to said multivibrator circuit,
        (4) a relay drive/relay circuit connected to the output of said multivibrator circuit, whereupon the closing of said inertial-activated switch, due to a panic stop of a vehicle, the current from the power source turns ON said silicon controlled rectifier which then enables said multivibrator circuit which in turn, applied a pulsating current to a coil of a relay located in said relay drive/relay circuit causing said relay to pulsate a normally closed contact of said relay causing said at least one brake light to rapidly flash ON and OFF in accordance with the pulsating current set by a time constant in said multivibrator circuit, and
    b) wherein said existing vehicle brake-light circuit under normal braking conditions, provide means for bypassing said flashing brake light circuit to allow the power source to be applied directly to said at least one brake light through the normally closed contact of said relay.

2. The system as specified in claim 1 wherein said multivibrator circuit comprising a flip-flop which consists of a pair of cross-connected transistors that continuously switch alternatively from conducting to nonconducting, generating a pulse output that energizes said relay.

3. The system as specified in claim 1 wherein said inertia-activated switch is comprised of a mercury switch.

4. The system as specified in claim 3 wherein said mercury switch is attached to said inertia-operative switching circuit with selecting slope means for allowing said switch to be placed in a selective slope with respect to the vehicle's horizontal plane with the conductive base end of said switch located higher than its front end so that the relationship between inertia and gravity is utilized to close electrical leads in the conductive base end.

5. The system as specified in claim 4 wherein said mercury switch is sloped at angle between 25 and 30 degrees.

6. The system as specified in claim 5 wherein said selecting slope means for said mercury switch is provided by the electrical leads extending from the conductive base end of said mercury switch.

7. The system as specified in claim 5 wherein said selecting slope means for said mercury switch comprises a housing into which is inserted said mercury switch with its electrical leads extending form the back of said housing, said housing further having an outwardly extending side tab that attaches by means of a fastener to a structural member on the vehicle near said system.

8. The system as specified in claim 1 wherein said power source is comprised of the vehicle's 12-volt battery.

9. The system as specified in claim 1 wherein said relay in said relay drive/relay circuit comprises a 12-volt relay that has its pole connected to the relay coil.

10. The system as specified in claim 1 further comprising a second set of at least one brake light connected in parallel with said at least one brake light and located on the front section of said vehicle.

11. The system as specified in claim 10 wherein said second set of at least one brake light is comprised of the vehicle's front right and left turning lights.

* * * * *